US012638805B2

(12) United States Patent
Sekido et al.

(10) Patent No.: US 12,638,805 B2
(45) Date of Patent: May 26, 2026

(54) ELECTROPHOTOGRAPHIC PHOTOSENSITIVE MEMBER, PROCESS CARTRIDGE, AND ELECTROPHOTOGRAPHIC APPARATUS

(71) Applicant: CANON KABUSHIKI KAISHA, Tokyo (JP)

(72) Inventors: Kunihiko Sekido, Shizuoka (JP); Shuhei Iwasaki, Kanagawa (JP); Tatsuya Ohsawa, Shizuoka (JP); Naoyuki Matsumoto, Fukui (JP); Atsushi Okuda, Kanagawa (JP); Tsutomu Nishida, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 511 days.

(21) Appl. No.: 18/463,501

(22) Filed: Sep. 8, 2023

(65) Prior Publication Data

US 2024/0118655 A1 Apr. 11, 2024

(30) Foreign Application Priority Data

Sep. 21, 2022 (JP) ................................ 2022-150273

(51) Int. Cl.

*G03G 5/05* (2006.01)
*G03G 5/06* (2006.01)
*G03G 21/18* (2006.01)

(52) U.S. Cl.

CPC ... *G03G 21/1814* (2013.01); *G03G 5/061443* (2020.05); *G03G 5/06145* (2020.05)

(58) Field of Classification Search

CPC .......... G03G 5/06142; G03G 5/06144; G03G 5/061443

See application file for complete search history.

(56) References Cited

U.S. PATENT DOCUMENTS

| | | | |
|---|---|---|---|
| 7,141,341 | B2 | 11/2006 | Sekido |
| 7,645,547 | B2 | 1/2010 | Okuda |

(Continued)

FOREIGN PATENT DOCUMENTS

| | | | | |
|---|---|---|---|---|
| JP | 2009-025382 | * | 2/2009 | ............... G03G 5/05 |
| JP | 2016-160239 A | | 9/2016 | |
| JP | 2018-120062 A | | 8/2018 | |

OTHER PUBLICATIONS

Translation of JP 2009-025382.*

(Continued)

*Primary Examiner* — Peter L Vajda

(74) *Attorney, Agent, or Firm* — VENABLE LLP

(57) ABSTRACT

An object of the present disclosure is to provide an electrophotographic photosensitive member with suppressed positive ghosts, and a process cartridge and an electrophotographic apparatus each including the electrophotographic photosensitive member. The present disclosure provides an electrophotographic photosensitive member having a support and a photosensitive layer on the support; the photosensitive layer comprises (α) a compound represented by the formula (1), and (β) at least one selected from the group consisting of a compound represented by the formula (2) and a compound represented by the formula (3), wherein a content of the (β) with respect to a content of the (α) is 50 to 850 mass ppm in the photosensitive layer.

7 Claims, 2 Drawing Sheets

(56) References Cited

U.S. PATENT DOCUMENTS

| | | | |
|---|---|---|---|
| 7,655,370 | B2 | 2/2010 | Kitamura |
| 8,343,699 | B2 | 1/2013 | Nagasaka |
| 8,465,889 | B2 | 6/2013 | Sekido |
| 8,524,430 | B2 | 9/2013 | Takagi |
| 8,546,050 | B2 | 10/2013 | Maruyama |
| 8,632,931 | B2 | 1/2014 | Sekido |
| 8,632,935 | B2 | 1/2014 | Sugiyama |
| 8,669,027 | B2 | 3/2014 | Anezaki |
| 8,753,789 | B2 | 6/2014 | Ogaki |
| 8,765,335 | B2 | 7/2014 | Tanaka |
| 8,795,936 | B2 | 8/2014 | Sekido |
| 8,815,479 | B2 | 8/2014 | Shida |
| 8,921,020 | B2 | 12/2014 | Murai |
| 8,980,508 | B2 | 3/2015 | Okuda |
| 8,980,509 | B2 | 3/2015 | Noguchi |
| 9,029,054 | B2 | 5/2015 | Okuda |
| 9,063,505 | B2 | 6/2015 | Sekiya |
| 9,069,267 | B2 | 6/2015 | Kaku |
| 9,114,565 | B2 | 8/2015 | Kawai |
| 9,170,506 | B2 | 10/2015 | Tanaka |
| 9,170,507 | B2 | 10/2015 | Sugiyama |
| 9,188,888 | B2 | 11/2015 | Okuda |
| 9,207,550 | B2 | 12/2015 | Okuda |
| 9,280,071 | B2 | 3/2016 | Maruyama |
| 9,280,072 | B2 | 3/2016 | Ogaki |
| 9,282,615 | B2 | 3/2016 | Yamagishi |
| 9,304,416 | B2 | 4/2016 | Noguchi |
| 9,335,645 | B2 | 5/2016 | Tagami |
| 9,341,964 | B2 | 5/2016 | Ogaki |
| 9,436,106 | B2 | 9/2016 | Kuno |
| 9,436,107 | B2 | 9/2016 | Murakami |
| 9,442,401 | B2 | 9/2016 | Sekido |
| 9,459,545 | B2 | 10/2016 | Tanaka |
| 9,477,163 | B2 | 10/2016 | Nishi |
| 9,541,850 | B2 | 1/2017 | Nishida |
| 9,563,139 | B2 | 2/2017 | Kawahara |
| 9,575,422 | B2 | 2/2017 | Okuda |
| 9,599,917 | B2 | 3/2017 | Okuda |
| 9,645,515 | B2 | 5/2017 | Kuno |
| 9,645,516 | B2 | 5/2017 | Kawahara |
| 9,684,277 | B2 | 6/2017 | Yamamoto |
| 9,726,992 | B2 | 8/2017 | Sakuma |
| 9,760,030 | B2 | 9/2017 | Sekiya |
| 9,772,568 | B2 | 9/2017 | Sekido |
| 9,772,596 | B2 | 9/2017 | Mitsui |
| 9,791,792 | B2 | 10/2017 | Miyauchi |
| 9,811,011 | B2 | 11/2017 | Nishi |
| 9,851,648 | B2 | 12/2017 | Nishi |
| 9,864,285 | B2 | 1/2018 | Nishi |
| 9,869,032 | B2 | 1/2018 | Kawahara |
| 9,921,498 | B2 | 3/2018 | Sekido |
| 10,372,050 | B2 | 8/2019 | Nishi |
| 10,416,581 | B2 | 9/2019 | Ito |
| 10,452,021 | B2 | 10/2019 | Miura |
| 10,539,892 | B2 | 1/2020 | Nishida |
| 10,545,453 | B2 | 1/2020 | Iwasaki |
| 10,558,132 | B2 | 2/2020 | Ishiduka |
| 10,558,133 | B2 | 2/2020 | Nakamura |
| 10,642,177 | B2 | 5/2020 | Nakamura |
| 10,663,913 | B2 | 5/2020 | Yamaai |
| 10,691,033 | B2 | 6/2020 | Nishida |
| 10,747,130 | B2 | 8/2020 | Okuda |
| 10,747,131 | B2 | 8/2020 | Watanabe |
| 10,831,117 | B2 | 11/2020 | Sakakibara |
| 10,831,118 | B2 | 11/2020 | Watanabe |
| 10,838,315 | B2 | 11/2020 | Shimozawa |
| 10,942,462 | B2 | 3/2021 | Ito |
| 11,003,102 | B2 | 5/2021 | Ishiduka |
| 11,150,566 | B2 | 10/2021 | Iwasaki |
| 11,256,186 | B2 | 2/2022 | Shimozawa |
| 11,366,402 | B2 | 6/2022 | Ishiduka |
| 11,392,050 | B2 | 7/2022 | Nishida |
| 11,392,074 | B2 | 7/2022 | Ishida |
| 11,726,414 | B2 | 8/2023 | Sekido |
| 11,782,353 | B2 | 10/2023 | Nakamura |
| 2018/0210355 | A1 | 7/2018 | Fukuma |
| 2021/0318629 | A1 | 10/2021 | Nishi |
| 2021/0325794 | A1 | 10/2021 | Iwasaki |
| 2023/0058278 | A1 | 2/2023 | Maruyama |
| 2023/0059041 | A1 | 2/2023 | Kaku |
| 2023/0059773 | A1 | 2/2023 | Yamaal |
| 2023/0090596 | A1 | 3/2023 | Sekido |
| 2023/0093328 | A1 | 3/2023 | Nishi |
| 2023/0115474 | A1 | 4/2023 | Watanabe |
| 2023/0288826 | A1 | 9/2023 | Nakazono |
| 2023/0288836 | A1 | 9/2023 | Iwasaki |
| 2023/0288867 | A1 | 9/2023 | Shimozawa |
| 2023/0333494 | A1 | 10/2023 | Watariguchi |
| 2023/0350314 | A1 | 11/2023 | Sekido |

OTHER PUBLICATIONS

U.S. Appl. No. 18/340,228, Kohei Makisumi, filed Jun. 23, 2023.
U.S. Appl. No. 18/463,725, Tatsuya Ohsawa, filed Sep. 8, 2023.
U.S. Appl. No. 18/463,749, Shuhei Iwasaki, filed Sep. 8, 2023.
U.S. Appl. No. 18/489,936, Tatsuya Yamaai, filed Oct. 19, 2023.

* cited by examiner

ELECTROPHOTOGRAPHIC PHOTOSENSITIVE MEMBER, PROCESS CARTRIDGE, AND ELECTROPHOTOGRAPHIC APPARATUS

BACKGROUND OF THE INVENTION

Field of the Invention

The present disclosure relates to an electrophotographic photosensitive member, and a process cartridge and an electrophotographic apparatus each including the electrophotographic photosensitive member.

Description of the Related Art

In recent years, the demand for the quality of electrophotographic images has increased. For example, the acceptable degree of positive ghost is much stricter than before. In forming an electrophotographic image, a halftone image is formed based on the portions of an electrophotographic photosensitive member to which a light beam is irradiated. The phenomenon in which the portion in the electrophotographic image corresponding to the irradiated portion in the previous rotation is darkened is called "positive ghost".

Japanese Patent Application Laid-Open No. 2016-160239 and Japanese Patent Application Laid-Open No. 2018-120062 describe techniques for improving ghost properties by using a combination of charge transporting substances with specific structures and additives.

SUMMARY OF THE INVENTION

The inventors have investigated and found that there is still room for improvement in the above conventional techniques with respect to suppression of positive ghosts.

It is one object of the present disclosure to provide an electrophotographic photosensitive member with suppressed positive ghosts, and a process cartridge and an electrophotographic apparatus each including the electrophotographic photosensitive member.

After intense investigation, the inventors found that it was possible to suppress positive ghost at high level by containing a compound with a specific structure in the photosensitive layer.

Accordingly, an object of the present disclosure is to provide an electrophotographic photosensitive member which can achieve suppression of positive ghost at high level. In addition an object of the present disclosure is to provide a process cartridge and an electrophotographic apparatus equipped with the electrophotographic photosensitive member.

The above-mentioned aspect is achieved by the present disclosure described below. That is, the electrophotographic photosensitive member of the present disclosure has a support and a photosensitive layer on the support;

the photosensitive layer comprises ($\alpha$) a compound represented by the following formula (1), and ($\beta$) at least one selected from the group consisting of a compound represented by the following formula (2) and a compound represented by the following formula (3), wherein a content of the ($\beta$) with respect to a content of the ($\alpha$) is 50 to 850 mass ppm in the photosensitive layer.

(1)

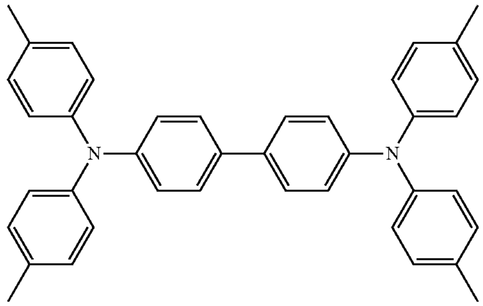

(2)

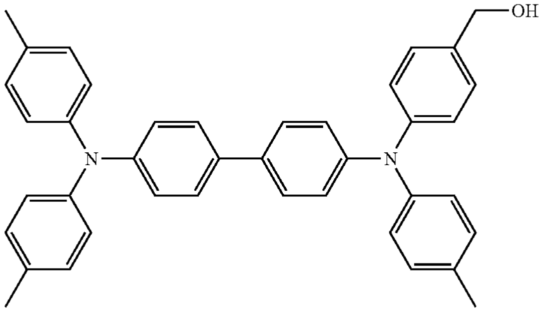

(3)

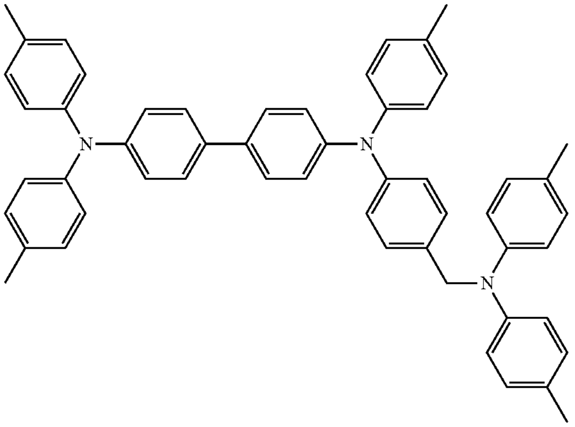

Another aspect of the present disclosure provides a process cartridge for electrophotography comprising: the above electrophotographic photosensitive member; and at least one unit selected from the group consisting of a charging unit, a developing unit, and a cleaning unit, the process cartridge for electrophotography integrally supporting the electrophotographic photosensitive member and the at least one unit, and being detachably attachable to a main body of an electrophotographic apparatus.

Still another aspect of the present disclosure provides an electrophotographic apparatus comprising: the above electrophotographic photosensitive member, an exposing unit, a charging unit, a developing unit, and a transfer unit.

Further features of the present invention will become apparent from the following description of exemplary embodiments with reference to the attached drawings.

DESCRIPTION OF THE EMBODIMENTS

Figure 1:
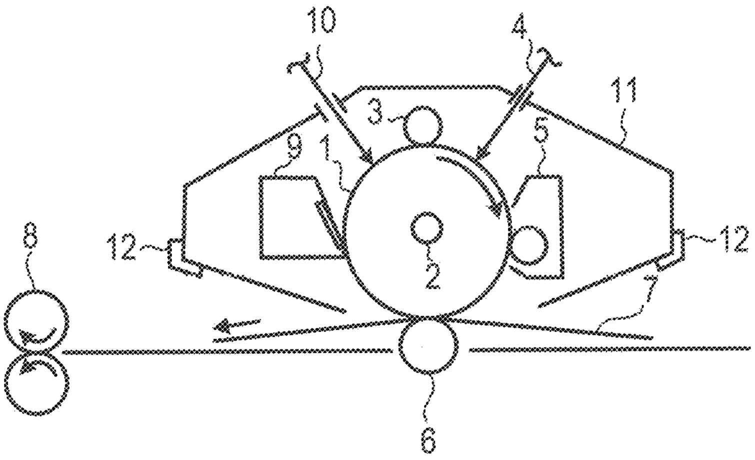
FIG. 1 is a view for illustrating an example of the schematic configuration of an electrophotographic apparatus having a process cartridge with the electrophotographic photosensitive member of the present disclosure.

The electrophotographic photosensitive member of the present disclosure is characterized in having a support and a photosensitive layer on the support; the photosensitive layer comprises (α) a compound represented by the following formula (1), and (β) at least one selected from the group consisting of a compound represented by the following formula (2) and a compound represented by the following formula (3), wherein a content of the (β) with respect to a content of the (α) is 50 to 850 mass ppm in the photo sensitive layer.

(1)

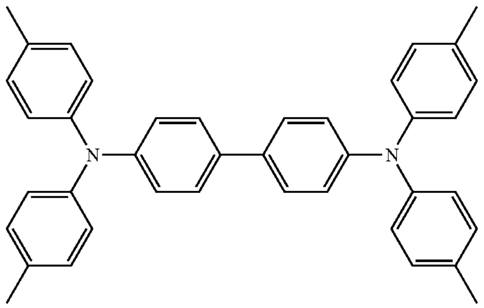

(2)

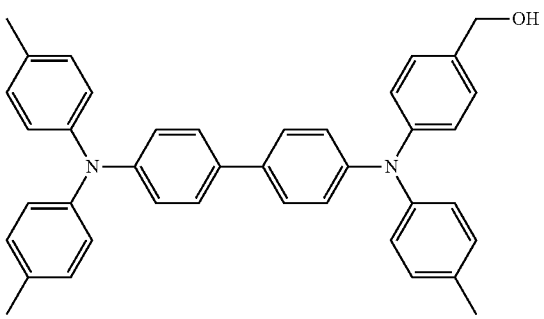

(3)

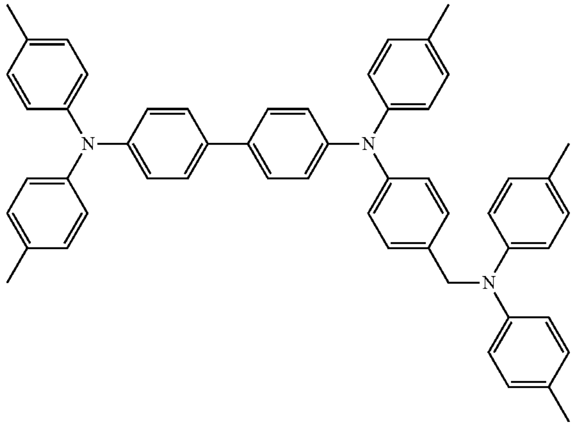

Further, the present disclosure relates to a process cartridge for electrophotography comprising: the above electrophotographic photosensitive member; and at least one unit selected from the group consisting of a charging unit, a developing unit, and a cleaning unit, the process cartridge for electrophotography integrally supporting the electrophotographic photosensitive member and the at least one unit, and being detachably attachable to a main body of an electrophotographic apparatus.

Still further, the present disclosure relates to an electrophotographic apparatus comprising: the above electrophotographic photosensitive member, an exposing unit, a charging unit, a developing unit, and a transfer unit.

The inventors assume that the above configuration can solve the above technical problems by the following mechanism.

Ghost is caused by a delay in the transfer of the carriers generated in the light-irradiated part of the photosensitive layer, which remain until the next rotation, showing the difference in the image density from the non-light-irradiated part.

The compound represented by the formula (2) does not inhibit the transfer of carriers because its basic molecular skeleton is similar to that of the compound represented by the formula (1). Not only that, oxygen atoms with unshared pairs of electrons participate in the transfer of carriers and form the carrier transfer path. Therefore, residual carriers are reduced and ghost is reduced.

The compound represented by the formula (3), like the compound represented by the formula (2), does not inhibit the transfer of the carrier because the basic molecular skeleton is similar to that of the compound represented by the formula (1). In addition, compared with the compound represented by the formula (1), the compound represented by the formula (3) has a greatly expanded electron cloud which forms a carrier transfer path therefore fewer residual carriers are made. Thus, the ghost is decreased.

[Electrophotographic Photosensitive Member]

The electrophotographic photosensitive member of the present disclosure has a support and a photosensitive layer on the support.

As a method of producing the electrophotographic photosensitive member of the present disclosure, there is given a method involving preparing coating liquids for respective layers to be described later, applying the coating liquids for the respective layers in a desired order, and drying the coating liquids. As a method of applying the coating liquids, there are given, for example, dip coating, spray coating, inkjet coating, roll coating, die coating, blade coating, curtain coating, wire bar coating, and ring coating. Of those, dip coating is preferred from the viewpoints of efficiency and productivity. Each layer is described below.

[Support]

In the present disclosure, the electrophotographic photosensitive member includes a support. In the present disclosure, the support is preferably an electroconductive support having electroconductivity. In addition, examples of the shape of the support include a cylindrical shape, a belt shape, and a sheet shape. Of those, a cylindrical support is preferred. In addition, the surface of the support may be subjected to, for example, electrochemical treatment such as anodization, blast treatment, or cutting treatment.

A metal, a resin, glass, or the like is preferred as a material for the support.

Examples of the metal include aluminum, iron, nickel, copper, gold, stainless steel, and alloys thereof. Of those, aluminum is preferred, and the support is preferably an aluminum support.

In addition, electroconductivity may be imparted to the resin or the glass through treatment involving, for example, mixing or coating the resin or the glass with an electroconductive material.

<Electroconductive Layer>

In the present disclosure, an electroconductive layer may be arranged on the support. The arrangement of the electroconductive layer can conceal flaws and unevenness in the surface of the support, and control the reflection of light on the surface of the support.

The electroconductive layer preferably contains electroconductive particles and a resin.

A material for the electroconductive particles is, for example, a metal oxide, a metal, or carbon black.

Examples of the metal oxide include zinc oxide, aluminum oxide, indium oxide, silicon oxide, zirconium oxide, tin oxide, titanium oxide, magnesium oxide, antimony oxide, and bismuth oxide. Examples of the metal include aluminum, nickel, iron, nichrome, copper, zinc, and silver.

Of those, the metal oxide is preferably used as the electroconductive particles, and in particular, titanium oxide, tin oxide, and zinc oxide are more preferably used.

When the metal oxide is used as the electroconductive particles, the surface of the metal oxide may be treated with a silane coupling agent or the like, or the metal oxide may be doped with an element, such as phosphorus or aluminum, or an oxide thereof.

In addition, the electroconductive particles may each be of a laminated configuration having a core particle and a coating layer coating the particle. Examples of the core particle include titanium oxide, barium sulfate, and zinc oxide. The coating layer is, for example, a metal oxide such as tin oxide.

In addition, when the metal oxide is used as the electroconductive particles, their volume-average particle diameter is preferably 1 to 500 nm, more preferably 3 to 400 nm.

Examples of the resin include a polyester resin, a polycarbonate resin, a polyvinyl acetal resin, an acrylic resin, a silicone resin, an epoxy resin, a melamine resin, a polyurethane resin, a phenol resin, and an alkyd resin.

In addition, the electroconductive layer may further contain, for example, a silicone oil, resin particles, or a concealing agent such as titanium oxide.

The average thickness of the electroconductive layer is preferably 1 to 50 μm, particularly preferably 3 to 40 μm.

The electroconductive layer may be formed by preparing a coating liquid for an electroconductive layer containing the above-mentioned respective materials and a solvent, forming a coating film thereof, and drying the coating film. Examples of the solvent to be used for the coating liquid include an alcohol-based solvent, a sulfoxide-based solvent, a ketone-based solvent, an ether-based solvent, an ester-based solvent, and an aromatic hydrocarbon-based solvent. A dispersion method for dispersing the electroconductive particles in the coating liquid for an electroconductive layer is, for example, a method involving using a paint shaker, a sand mill, a ball mill, or a liquid collision type high-speed disperser.

<Undercoat Layer>

In the present disclosure, an undercoat layer may be arranged on the support or the electroconductive layer. The arrangement of the undercoat layer can improve an adhesive function between layers to impart a charge injection-inhibiting function.

The undercoat layer preferably contains a resin. In addition, the undercoat layer may be formed as a cured film by polymerizing a composition containing a monomer having a polymerizable functional group.

Examples of the resin include a polyester resin, a polycarbonate resin, a polyvinyl acetal resin, an acrylic resin, an epoxy resin, a melamine resin, a polyurethane resin, a phenol resin, a polyvinyl phenol resin, an alkyd resin, a polyvinyl alcohol resin, a polyethylene oxide resin, a polypropylene oxide resin, a polyamide resin, a polyamic acid resin, a polyimide resin, a polyamide imide resin, and a cellulose resin.

Examples of the polymerizable functional group of the monomer having a polymerizable functional group include an isocyanate group, a blocked isocyanate group, a methylol group, an alkylated methylol group, an epoxy group, a metal alkoxide group, a hydroxy group, an amino group, a carboxy group, a thiol group, a carboxylic acid anhydride group, and a carbon-carbon double bond group.

In addition, the undercoat layer may further contain an electron-transporting substance, a metal oxide, a metal, an electroconductive polymer, and the like for the purpose of improving electric characteristics. Of those, an electron-transporting substance and a metal oxide are preferably used.

Examples of the electron-transporting substance include a quinone compound, an imide compound, a benzimidazole compound, a cyclopentadienylidene compound, a fluorenone compound, a xanthone compound, a benzophenone compound, a cyanovinyl compound, a halogenated aryl compound, a silole compound, and a boron-containing compound. An electron-transporting substance having a polymerizable functional group may be used as the electron-transporting substance and copolymerized with the above-mentioned monomer having a polymerizable functional group to form the undercoat layer as a cured film.

Examples of the metal oxide include indium tin oxide, tin oxide, indium oxide, titanium oxide, zinc oxide, aluminum oxide, and silicon dioxide. Examples of the metal include gold, silver, and aluminum.

When the metal oxide is used, the surface of the metal oxide may be treated with a silane coupling agent or the like, or the metal oxide may be doped with an element, such as phosphorus or aluminum, or an oxide thereof.

In addition, the undercoat layer may further contain an additive.

The undercoat layer has an average thickness of preferably from 0.1 to 50 μm, more preferably from 0.2 to 40 μm, particularly preferably from 0.3 to 30 μm.

The undercoat layer may be formed by preparing a coating liquid for an undercoat layer containing the above-mentioned respective materials and a solvent, forming a coating film thereof, and drying and/or curing the coating film. Examples of the solvent to be used for the coating liquid include an alcohol-based solvent, a ketone-based solvent, an ether-based solvent, an ester-based solvent, and an aromatic hydrocarbon-based solvent.

<Photosensitive Layer>

In the present disclosure, the photosensitive layer may be a monolayer type containing both charge generating substance and charge transporting substance, or a laminate type having a charge generating layer containing charge generating substance and a charge transporting layer containing charge transporting substance.

A charge generating layer and a charge transporting layer of the laminate type are described below.

<Charge Generating Layer>

The charge generating layer preferably includes a charge generating substance and a binder resin.

Examples of the charge generating substance include azo pigments, perylene pigments, polycyclic quinone pigments, indigo pigments, and phthalocyanine pigments. Of those, azo pigments and phthalocyanine pigments are preferred. Of the phthalocyanine pigments, titanyl phthalocyanine pigments, a chlorogallium phthalocyanine pigment, a hydroxygallium phthalocyanine pigment are preferable. In particular, titanyl phthalocyanine pigments are more preferable in point of view that the effect of hole transferability at interface between the charge generating layer and the charge transporting layer is high.

When titanyl phthalocyanine pigments are used as the charge generating substance, among titanyl phthalocyanine pigments, the one that contains a crystal particle with the crystal type showing peaks at Bragg angles 2θ of 9.8°±0.3° and 27.1°±0.3° in an X-ray diffraction spectrum using CuKα radiation is preferably used.

Measurement of powder X-ray diffraction of the phthalocyanine pigment contained in the electrophotographic photosensitive member of the present disclosure was performed under the following conditions.

[Powder X-Ray Diffraction Measurement]

Measuring machine for the use: X-ray diffractometer RINT-TTRII, manufactured by Rigaku Corporation X-ray tube bulb: Cu
X-ray wavelength: Kα1
Tube voltage: 50 KV
Tube current: 300 mA
Scanning method: 2θscan
Scanning rate: 4.0°/min
Sampling interval: 0.02°
Start angle 2θ: 5.0°
Stop angle 2θ: 35.0°
Goniometer: Rotor Horizontal Goniometer (TTR-2)
Attachment: Capillary Rotating Sample Stand
Filter: None
Detector: Scintillation counter
Incident monochrome: used
Slit: variable slit (parallel beam method)
Counter monochromator: not used
Divergent slit: open
Divergent longitudinal limiting slit: 10.00 mm
Scattering slit: open
Light receiving slit: open The content of charge generating substance in the charge generating layer is preferably 40 to 85 mass %, and more preferably 60 to 80 mass % with respect to the total mass of the charge generating layer.

Examples of resins include a polyester resin, a polycarbonate resin, a polyvinyl acetal resin, a polyvinyl butyral resin, an acrylic resin, a silicone resin, an epoxy resin, a melamine resin, a polyurethane resin, a phenol resin, a polyvinyl alcohol resin, a cellulose resin, a polystyrene resin, a polyvinyl acetate resin, a polyvinyl chloride resin, or the like. Among them, a polyvinyl butyral resin is preferable.

In addition, the charge generating layer may further contain an additive such as an antioxidant or an ultraviolet absorber. Specific examples thereof can include a hindered phenol compound, a hindered amine compound, a sulfur compound, a phosphorus compound, and a benzophenone compound.

An average film thickness of the charge generating layer is preferably 0.1 to 1 μm, and more preferably 0.15 to 0.4 μm.

The charge generating layer can be formed by preparing a coating liquid for a charge generating layer containing the above-described respective materials and a solvent, forming a coating film thereof, and drying the coating film. Examples of the solvent used in the coating liquid can include an alcohol-based solvent, a sulfoxide-based solvent, a ketone-based solvent, an ether-based solvent, an ester-based solvent, and an aromatic hydrocarbon-based solvent.

<Charge Transporting Layer>

The charge transporting layer preferably contains a charge transporting substance (a charge transporting compound) and a binder resin.

As mentioned above, the electrophotographic photosensitive member of the present disclosure contains a compound represented by the formula (1) in the photosensitive layer. When the photosensitive layer is laminate type, the charge transporting layer can contain a compound represented by the formula (1) as a charge transporting substance.

The charge transporting layer of the present disclosure further can contain charge transporting substances other than the compound represented by the formula (1).

Examples of the charge transporting substance include a polycyclic aromatic compound, a heterocyclic compound, a hydrazone compound, a styryl compound, an enamine compound, a benzidine compound, a triarylamine compound, and a resin having a group derived from each of those substances. Of those, a triarylamine compound and a benzidine compound are preferred.

The content of the (α) with respect to the total mass of the charge transporting substance is preferably 9 to 50 mass % and from the standpoint of achievement of both membranability of charge transporting layer and image quality, 25 to 50 mass % is more preferable.

Examples of binder resins include a polyester resin, a polycarbonate resin, an acrylic resin and a polystyrene resin. Among them, a polycarbonate resin and a polyester resin are preferable.

In addition, the content of the compound represented by the formula (1) with respect to the mass of the binder resin is preferably 20 to 200 mass % and more preferably 40 to 100 mass %.

In the electrophotographic photosensitive member of one aspect of the present disclosure, the photosensitive layer contains (α) a compound represented by the formula (1), and (β) at least one selected from the group consisting of a compound represented by the formula (2) and a compound represented by the formula (3).

In the photosensitive layer, the content of the (β) with respect to the content of the (α) needs to be 50 to 850 mass ppm and preferably 100 to 500 mass ppm.

In the photosensitive member of the present disclosure, the content of the compound represented by the formula (2) with respect to the content of the compound represented by the formula (1) is preferably 350 mass ppm or less.

It is more preferable for the photosensitive member of the present disclosure to contain the compound represented by the formula (3). The content of the compound represented by the formula (3) with respect to the content of the compound represented by the formula (1) is preferably 480 mass ppm or less and preferably 50 to 480 mass ppm and more preferably 100 to 270 mass ppm. In this concentration range, the carrier transfer path to the compound represented by the formula (1) can be formed.

In addition, in the photosensitive member of the present disclosure, the total content of the (β) with respect to the total mass of the photosensitive layer is preferably 3 to 30 mass ppm. In this concentration range, a carrier transfer path to the compound represented by the formula (1) can be formed.

In addition, the charge transporting layer may contain an additive, such as an antioxidant, a UV absorber, a plasticizer, a leveling agent, a lubricity imparting agent, or an abrasion resistance improver. Specific examples thereof include a hindered phenol compound, a hindered amine compound, a sulfur compound, a phosphorus compound, a benzophenone compound, a siloxane-modified resin, a silicone oil, fluorine resin particles, polystyrene resin particles, polyethylene resin particles, silica particles, alumina particles, and boron nitride particles.

The average film thickness of the charge transport layer is preferably 5 to 50 μm, more preferably 8 to 40 μm, and particularly preferably 10 to 30 μm.

The charge transporting layer may be formed by preparing a coating liquid for a charge transporting layer containing the above-mentioned respective materials and a solvent, forming a coating film thereof, and drying the coating film. Examples of the solvent to be used for the coating liquid include an alcohol-based solvent, a ketone-based solvent, an ether-based solvent, an ester-based solvent, and an aromatic hydrocarbon-based solvent. Of those, an ether-based solvent or an aromatic hydrocarbon-based solvent is preferable.

In the present disclosure, methods for measuring the contents of the charge transporting substance, the binder resin, the compound represented by the formula (2) or the compound represented by the formula (3) in the charge transporting layer are not particularly limited, but qualitative and quantitative determination can be used by a combination of Fourier transform infrared spectroscopy (FT-IR), matrix-assisted laser desorption/ionization mass spectrometry (MALDI-MS), nuclear magnetic resonance spectroscopy (NMR), liquid chromatography-mass spectrometry (LC/MS) and the like.

<Protection Layer>

In the present disclosure, a protection layer may be arranged on the charge transporting layer. The arrangement of the protection layer can improve durability.

It is preferred that the protection layer contains electroconductive particles and/or a charge transporting substance, and a resin.

Examples of the electroconductive particles include particles of metal oxides, such as titanium oxide, zinc oxide, tin oxide, and indium oxide.

Examples of the charge transporting substance include a polycyclic aromatic compound, a heterocyclic compound, a hydrazone compound, a styryl compound, an enamine compound, a benzidine compound, a triarylamine compound, and a resin having a group derived from each of those substances. Of those, a triarylamine compound and a benzidine compound are preferred.

Examples of the resin include a polyester resin, an acrylic resin, a phenoxy resin, a polycarbonate resin, a polystyrene resin, a phenol resin, a melamine resin, and an epoxy resin. Of those, a polycarbonate resin, a polyester resin, and an acrylic resin are preferred.

In addition, the protection layer may be formed as a cured film by polymerizing a composition containing a monomer having a polymerizable functional group. A reaction at that time is, for example, a thermal polymerization reaction, a photopolymerization reaction, or a radiation polymerization reaction. Examples of the polymerizable functional group of the monomer having a polymerizable functional group include an acryloyl group and a methacryloyl group. A material having a charge transporting ability may be used as the monomer having a polymerizable functional group.

The protection layer may contain an additive, such as an antioxidant, a UV absorber, a plasticizer, a leveling agent, a lubricity imparting agent, or an abrasion resistance improver. Specific examples thereof include a hindered phenol compound, a hindered amine compound, a sulfur compound, a phosphorus compound, a benzophenone compound, a siloxane-modified resin, a silicone oil, fluorine resin particles, polystyrene resin particles, polyethylene resin particles, silica particles, alumina particles, and boron nitride particles.

The average thickness of the protection layer is preferably 0.5 to 10 μm, more preferably 1 to 7 μm.

The protection layer may be formed by preparing a coating liquid for a protective layer containing the above-mentioned respective materials and a solvent, forming a coating film thereof, and drying and/or curing the coating film. Examples of the solvent to be used for the coating liquid include an alcohol-based solvent, a ketone-based solvent, an ether-based solvent, a sulfoxide-based solvent, an ester-based solvent, and an aromatic hydrocarbon-based solvent.

[Process Cartridge and Electrophotographic Apparatus]

A process cartridge of one aspect of the present disclosure has a feature of integrally supporting the electrophotographic photosensitive member described in the foregoing, and at least one unit selected from the group consisting of: a charging unit; a developing unit; and a cleaning unit, and being detachably attachable onto the main body of an electrophotographic apparatus.

In addition, an electrophotographic apparatus of one aspect of the present disclosure has a feature of including: the electrophotographic photosensitive member described in the foregoing; an exposing unit; a charging unit; a developing unit; and a transfer unit.

An example of the schematic configuration of an electrophotographic apparatus including the process cartridge including the electrophotographic photosensitive member is illustrated in FIG. 1.

An electrophotographic photosensitive member 1 of a cylindrical shape is rotationally driven about a shaft 2 in a direction indicated by the arrow at a predetermined peripheral speed. The surface of the electrophotographic photosensitive member 1 is charged to a positive or negative predetermined potential by a charging unit 3. Although a roller charging system based on a roller type charging member is illustrated in the figure, a charging system, such as a corona charging system, a contact charging system, or an injection charging system, may be adopted. The charged surface of the electrophotographic photosensitive member 1 is irradiated with exposure light 4 from an exposing unit (not shown), and thus an electrostatic latent image corresponding to target image information is formed thereon. The electrostatic latent image formed on the surface of the electrophotographic photosensitive member 1 is developed with a toner stored in a developing unit 5, and a toner image is formed on the surface of the electrophotographic photosensitive member 1. The toner image formed on the surface of the electrophotographic photosensitive member 1 is transferred onto a transfer material 7 by a transfer unit 6. The transfer material 7 onto which the toner image has been transferred is conveyed to a fixing unit 8, is subjected to treatment for fixing the toner image, and is printed out to the outside of the electrophotographic apparatus. The electrophotographic apparatus may include a cleaning unit 9 for removing a deposit such as the toner remaining on the surface of the electrophotographic photosensitive member 1 after the transfer. The cleaning unit 9 is preferably a cleaning blade having a urethane resin. In addition, a so-called cleaner-less system configured to remove the deposit with the developing unit or the like without separate arrangement of the cleaning unit 9 may be used. The electrophotographic apparatus may include an electricity-removing mechanism configured to subject the surface of the electrophotographic photosensitive member 1 to electricity-removing treatment with pre-exposure light 10 from a pre-exposing unit (not shown). In addition, a guiding unit 12 such as a rail may be arranged for detachably attachable a process cartridge 11 of one aspect of the present disclosure onto the main body of the electrophotographic apparatus.

The electrophotographic photosensitive member of one aspect of the present disclosure may be used in an electrophotographic apparatus, for example, a laser beam printer, an LED printer, a copying machine, a facsimile, and a multifunction machine thereof.

An electrophotographic photosensitive member with suppressed positive ghosts, and a process cartridge and an electrophotographic apparatus each including the electrophotographic photosensitive member can be provided by the present disclosure.

EXAMPLES

The present disclosure is described in more detail below by way of Examples and Comparative Examples. The present disclosure is by no means limited to the following Examples as long as its modifications do not deviate from the gist of the present disclosure. In the following description of Examples, the terms "part(s)" is on mass basis unless otherwise stated.

Synthesis Example of Compound

The confirmation of the compounds and the like to be used for the present disclosure was conducted by the following mass analysis method.

A matrix-assisted laser desorption ionization time-of-flight mass spectrometer (MALDI-TOF MS: ultraflex, manufactured by Bulker Daltonics, Inc.) was used. The measurement was conducted by the following conditions and the molecular weight of the object was confirmed based on the obtained peak top value. Acceleration voltage: 20 kV, mode: Reflector, molecular weight standard: fullerene C60.

Synthesis Example 1

Synthesis of the Compound Represented by the Formula (2)

N, N, N', N'-tetrakis (p-tolyl) benzidine (manufactured by Tokyo Chemical Industry Co., Ltd.) 100 parts, N-bromosuccinimide (manufactured by Tokyo Chemical Industry Co., Ltd.) 3.3 parts and azobisisobutyronitrile (manufactured by Tokyo Chemical Industry Co., Ltd.) 0.02 parts were added to a 1000 ml 3-neck flask containing 500 parts of carbon tetrachloride under a nitrogen gas flow condition at 0° C. and stirred for 2 hours. The mixture was then further stirred at room temperature for 2 hours.

After the completion of the reaction, the reaction solution was concentrated under reduced pressure, toluene was added to the residue, followed by filtration, and the filtrate was concentrated in an evaporator and purified by silica gel column chromatography (development solvent n heptane/toluene). Further, the recovered product was recrystallized with a mixed solution of toluene/hexane to give 12.1 parts of the compound represented by the following formula (4).

(4)

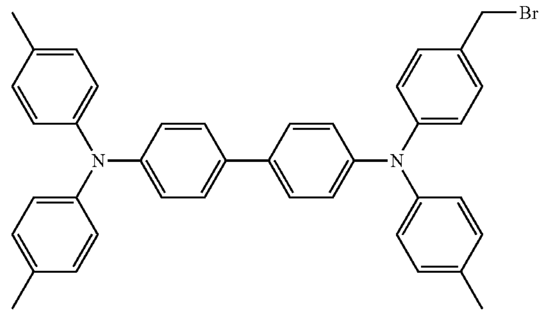

A compound represented by the formula (4) 10 parts, ion exchange water 1 part, and sodium hydroxide 1 part were added to a 300 ml three-neck flask containing 150 parts of tetrahydrofuran under a flow of nitrogen at 25° C., and the mixture was heated to a reflux condition and stirred for 8 hours.

After the completion of the reaction, the reaction solution was concentrated under reduced pressure, toluene was added to the residue, followed by filtration, and the filtrate was concentrated in an evaporator and purified by silica gel column chromatography (development solvent n-heptane/toluene). Further, the recovered product was recrystallized with a mixed solution of toluene/hexane to give 2.4 parts of the compound represented by the formula (2).

When this compound was measured by MALDI-TOF MS, a peak top value of 560 was obtained.

Synthesis Example 2

Synthesis of the Compound Represented by the Formula (3)

A compound represented by the formula (4) 10 parts, lithium bis (trimethylsilyl) amide (26% tetrahydrofuran solution) (manufactured by Tokyo Chemical Industry Co., Ltd.) 1 part and p, p'-ditolylamine (manufactured by Tokyo Chemical Industry Co., Ltd.) 5 parts were added to a 300 ml three-neck flask containing 150 parts of tetrahydrofuran under a flow of nitrogen at 25° C. and stirred for 8 hours.

After the completion of the reaction, the reaction solution was concentrated under reduced pressure, toluene was added to the residue, followed by filtration, and the filtrate was concentrated in an evaporator and purified by silica gel column chromatography (development solvent n-heptane/toluene). Further, the recovered product was recrystallized with a mixed solution of toluene/hexane to give 1.2 parts of the compound represented by the formula (3).

When this compound was measured by MALDI-TOF MS, a peak top value of 739 was obtained.

Example 1

<Support>

An aluminum cylinder (JIS-A3003, aluminum alloy) 24 mm in diameter and 257 mm in length was designated as a support (electroconductive support).

<Undercoat Layer>

A dispersion was prepared by adding 3 parts of rutile type titanium oxide particles (average primary particle size: 150 nm, manufactured by Tayca corporation), 4.5 parts of N-methoxymethylated nylon (Trade name: Tresin (trademark) EF-30T, manufactured by Nagase ChemteX Corporation) and 1.5 parts of copolymerized nylon resin (Trade name: Amiran CM8000, manufactured by Toray Industries, Inc.) to a mixed solvent of 90 parts of methanol and 60 parts of 1-butanol. The dispersion was subjected to dispersion treatment using 1.0 mm diameter glass beads in a vertical sand mill for 6 hours. The dispersion was further subjected to a dispersion treatment by an ultrasonic disperser (UT-205, Sharp Corporation) for 1 hour to obtain the coating liquid 1 for the undercoat layer. The output of the ultrasonic disperser was set at 100%. No media such as glass beads were used in this milling process.

Then, the obtained coating liquid 1 for the undercoat layer was dip-coated on the above support to form a coating film, and the coating film was heated and dried at a temperature of 100° C. for 10 minutes to form an undercoat layer with a thickness of 2 μm.

<Charge Generating Layer>

A mixture of 15 parts of titanyl phthalocyanine pigment (CG-01H manufactured by IT Chemical Co., LTD.) with the crystal type showing peaks at Bragg angles 2θ of 9.8°±0.3° and 27.1°±0.3° in an X-ray diffraction spectrum using CuKα radiation, 10 parts polyvinyl butyral (trade name: S-LEC (trademark) BX-1, manufactured by Sekisui Chemical Co., LTD.), 139 parts cyclohexanone, and 354 parts of glass beads of 0.9 mm diameter were dispersed in a sand mill (K-800, manufactured by Igarashi Machine Production Co. Ltd (Aimex Co., LTD. now), 70 mm disk diameter, 5 disks) with cooling water temperature of 18° C. for 4 hours. The dispersion was performed under the condition that the disk rotated 1,800 times per minute. Coating liquid 1 for the charge generating layer was prepared by adding 326 parts of cyclohexanone and 465 parts of ethyl acetate to the obtained dispersion.

Then, the resulting coating liquid 1 for the charge generating layer was dip-coated on the undercoat layer to form a coating film, and the coating film was heated and dried at 100° C. for 10 minutes to form a charge generating layer with a thickness of 0.2 μm.

<Charge Transporting Layer>

A compound represented by the formula (1) (N, N, N', N'-Tetrakis (p-tolyl) benzidine sublimation refined product (manufactured by Tokyo Chemical Industry Co., Ltd.)) as charge transporting substance 20 parts, a compound represented by the following formula (5) as charge transporting substance 80 parts, a polycarbonate (Trade name: Iupilon (trademark) Z400, manufactured by Mitsubishi Engineering-Plastics Corporation) as a binder resin 120 parts, and a compound represented by the formula (3) 0.0048 parts were prepared.

(5)

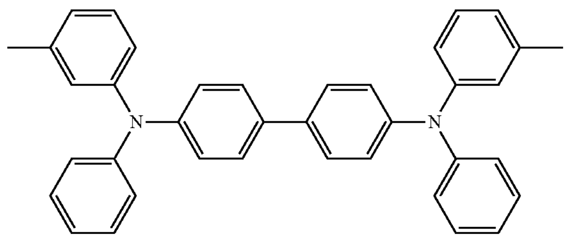

The above materials were dissolved in a mixed solvent of 500 parts of orthoxylene/250 parts of methyl benzoate/500 parts dimethoxymethane to prepare a coating liquid for the charge transporting layer.

Then, the obtained coating liquid for the charge transporting layer was dip-coated on the charge generating layer to form a coating film, which was then dried at 120° C. for 30 minutes to form a charge transporting layer with a thickness of 16 μm.

<Analysis of Amount of Compound>

The mass ratio of each of charge transporting substances, binder resin and other compounds with respect to the total mass of the charge transporting layer was analyzed under the following conditions.

The surface of the obtained electrophotographic photosensitive member was scraped off with a razor to obtain a charge transporting layer section. The charge transporting layer section was dissolved in deuterated chloroform, and then subjected to 1H-NMR measurement (equipment: AVANCEIII 500, manufactured by BRUKER) to determine the mass ratios of the compound represented by the formula (1), the compound represented by the formula (5), and the binder resin with respect to the total mass of the charge transporting layer were obtained.

In addition, the charge transporting layer section was dissolved in chloroform and dropped into methanol to precipitate the binder resin. The obtained methanol solution was then filtered using a 0.45 μm diameter filter, and the obtained filtrate was subjected to liquid chromatography mass spectrometry (LC/MS) to determine the mass ratio of the compound represented by the formula (1) with respect to the compounds represented by the formulae (2) and (3). The obtained result is shown in Table 1.

Examples 2 to 24

The electrophotographic photosensitive members were prepared and analyzed in the same manner as in Example 1, except that the addition amounts were changed so that the types and contents of the charge transporting substances, the contents of the binder resin, the contents of the compound represented by the formula (2) and the compound represented by the formula (3) were the values in Table 1. The results obtained are shown in Table 1.

Example 25

The electrophotographic photosensitive member was prepared and analyzed in the same manner as in Example 1, except that a compound represented by the following formula (6) was used instead of the compound represented by the formula (5) as a charge transporting substance, and the addition amount was changed so that the content of the charge transporting compound, the content of the binder resin, the contents of the compound represented by the formula (2) and the compound represented by the formula (3) were the values in Table 1. The results obtained are shown in Table 1.

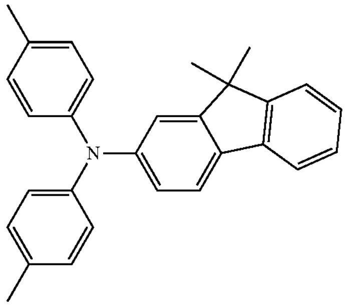

(6)

Comparative Examples 1 to 2

The electrophotographic photosensitive members were prepared and analyzed in the same manner as in Example 1, except that the addition amounts were changed so that the types and the contents of the charge transporting substances, the contents of the binder resin, the contents of the compound represented by the formula (2) and the compound represented by the formula (3) were the values in Table 1.

Comparative Example 3

The electrophotographic photosensitive member was prepared and analyzed in the same manner as in Example 1, except that a compound represented by the formula (6) and a compound represented by the formula (7) were used instead of the compounds represented by the formula (1), and (5) as the charge transporting substances, and the addition amount was changed so that the contents of the charge transporting substances, the content of the binder resin, the contents of the compound represented by the formula (2) and the compound represented by the formula (3) were the values in Table 1. The results obtained are shown in Table 1.

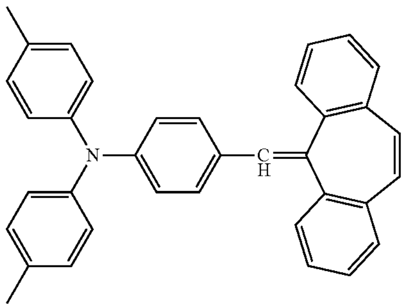

(7)

EVALUATION

Regarding the photosensitive members prepared in Examples 1 to 25 and the photosensitive members prepared in Comparative Examples 1 to 3, potential fluctuations were evaluated under the following conditions.

Each of the prepared electrophotographic photosensitive members was mounted to a modified laser beam printer (primary charging: roller contact DC charging, process speed 120 mm/s, laser exposure) manufactured by Canon Inc. (trade name: LBP-2510) under an environment of temperature of 23° C. and humidity of 50% RH, and the output images were evaluated. Details are as follows:

[Surface Potential Evaluation]

The process cartridge for the cyan color for the above laser beam printer was modified, and a potential probe (model6000B-8, manufactured by Trek Japan Corporation) was mounted to the developing position. Next, the potential of the central part of the electrophotographic photosensitive member was measured using a surface electrometer (model344, manufactured by Trek Japan Corporation). The amount of exposure light was set so that the dark potential (Vd) was −600 V and the light potential (Vl) was −150 V.

Then, each of the prepared electrophotographic photosensitive member was mounted to the process cartridge for cyan color for the above laser beam printer, and the process cartridge was mounted to the cyan process cartridge station to output the image.

First, image output was performed consecutively in the order of a solid white image (1 image), ghost evaluation images (5 images), a solid black image (1 image), and ghost evaluation images (5 images).

Figure 2:
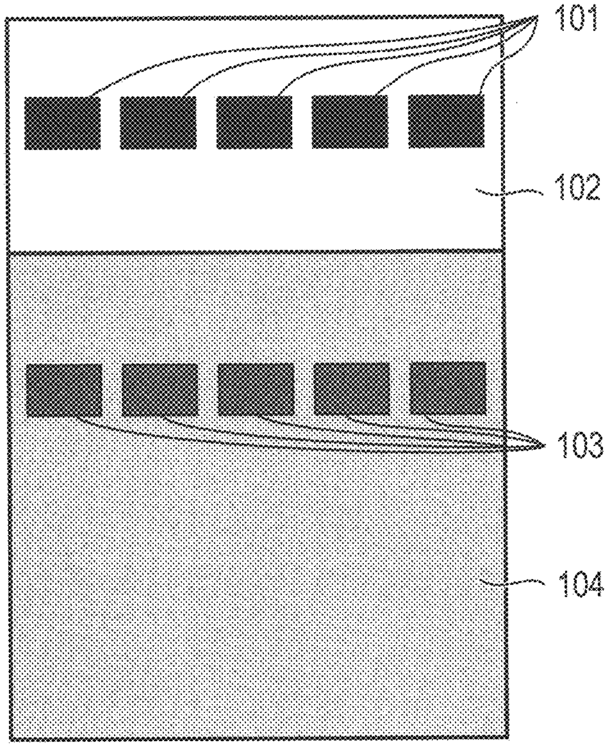
FIG. 2 is a view for illustrating an example of an image for ghost evaluation in the present disclosure.
Figure 3:
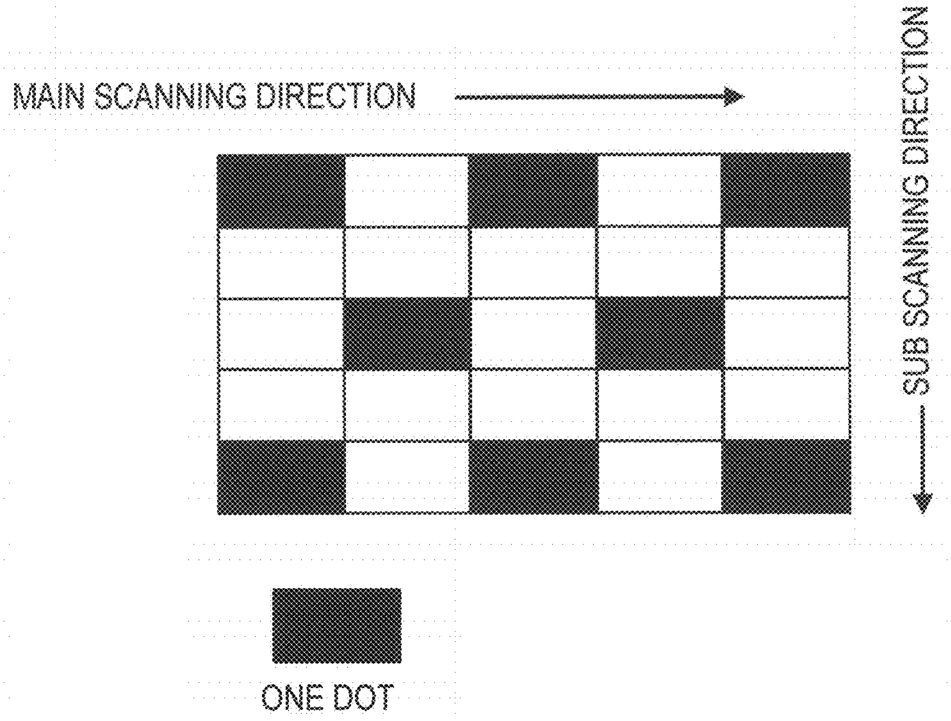
FIG. 3 is a view for illustrating an example of a halftone image in the present disclosure.

As for the ghost evaluation image, as shown in FIG. 2, square solid images were output in the white image at the top of the image, and then a halftone image of the one-dot knight-jump pattern shown in FIG. 3 was created. In FIG. 2, 101 is a solid image, 102 is a white image, 103 is a ghost part, and 104 is a one-dot knight-jump pattern image.

The evaluation of positive ghosts was performed by measuring the density difference (Macbeth density difference) between the Macbeth density of halftone images of a one-dot knight-jump pattern and the Macbeth density of ghost part (the part in which positive ghost may occur).

Macbeth density difference at 10 points in one image for ghost evaluation were measured with a spectrodensitometer (trade name: X-Rite 504/508 manufactured by X-Rite Corp.). The same operation was made with respect to all 10 images for ghost evaluation, and the average of a total of 100 points was calculated as the Macbeth density difference. The Macbeth density difference is shown in Table 1. The larger the Macbeth density, the stronger the positive ghost. The smaller the Macbeth density, the more suppressed the positive ghost.

TABLE 1

| | Charge transporting substance 1 | | Charge transporting substance 2 | | | Content ratio with respect to charge transporting substance 1 | | | Content ratio of Compounds (2) + (3) with respect to total mass of | Difference |
|---|---|---|---|---|---|---|---|---|---|---|
| Example | Type | Parts by mass | Type | Parts by mass | Resin | Compound (2) | Compound (3) | Compounds (2) + (3) | photosensitive layer (mass ppm) | in Macbeth density |
| 1 | Compound (1) | 20 | Compound (5) | 80 | 120 | 0 | 240 | 240 | 22 | 0.023 |
| 2 | Compound (1) | 20 | Compound (5) | 80 | 120 | 210 | 120 | 330 | 30 | 0.025 |
| 3 | Compound (1) | 20 | Compound (5) | 80 | 120 | 260 | 0 | 260 | 24 | 0.025 |

TABLE 1-continued

| Example | Charge transporting substance 1 Type | Charge transporting substance 1 Parts by mass | Charge transporting substance 2 Type | Charge transporting substance 2 Parts by mass | Resin | Content ratio with respect to charge transporting substance 1 Compound (2) | Content ratio with respect to charge transporting substance 1 Compound (3) | Content ratio with respect to charge transporting substance 1 Compounds (2) + (3) | Content ratio of Compounds (2) + (3) with respect to total mass of photosensitive layer (mass ppm) | Difference in Macbeth density |
|---|---|---|---|---|---|---|---|---|---|---|
| 4 | Compound (1) | 40 | Compound (5) | 60 | 120 | 0 | 120 | 120 | 22 | 0.027 |
| 5 | Compound (1) | 40 | Compound (5) | 60 | 120 | 120 | 40 | 160 | 29 | 0.028 |
| 6 | Compound (1) | 40 | Compound (5) | 60 | 120 | 110 | 0 | 110 | 20 | 0.028 |
| 7 | Compound (1) | 20 | Compound (5) | 80 | 120 | 0 | 80 | 80 | 7 | 0.033 |
| 8 | Compound (1) | 20 | Compound (5) | 80 | 120 | 30 | 40 | 70 | 6 | 0.031 |
| 9 | Compound (1) | 20 | Compound (5) | 80 | 120 | 90 | 0 | 90 | 8 | 0.033 |
| 10 | Compound (1) | 40 | Compound (5) | 60 | 120 | 0 | 50 | 50 | 9 | 0.032 |
| 11 | Compound (1) | 40 | Compound (5) | 60 | 120 | 60 | 30 | 90 | 16 | 0.033 |
| 12 | Compound (1) | 40 | Compound (5) | 60 | 120 | 80 | 0 | 80 | 15 | 0.033 |
| 13 | Compound (1) | 20 | Compound (5) | 80 | 120 | 280 | 230 | 510 | 46 | 0.032 |
| 14 | Compound (1) | 20 | Compound (5) | 80 | 120 | 0 | 680 | 680 | 62 | 0.039 |
| 15 | Compound (1) | 20 | Compound (5) | 80 | 120 | 600 | 0 | 600 | 55 | 0.039 |
| 16 | Compound (1) | 40 | Compound (5) | 60 | 120 | 200 | 220 | 420 | 76 | 0.032 |
| 17 | Compound (1) | 40 | Compound (5) | 60 | 120 | 0 | 500 | 500 | 91 | 0.037 |
| 18 | Compound (1) | 40 | Compound (5) | 60 | 120 | 610 | 0 | 610 | 111 | 0.038 |
| 19 | Compound (1) | 20 | Compound (5) | 80 | 120 | 0 | 840 | 840 | 76 | 0.041 |
| 20 | Compound (1) | 20 | Compound (5) | 80 | 120 | 150 | 620 | 770 | 70 | 0.043 |
| 21 | Compound (1) | 20 | Compound (5) | 80 | 120 | 700 | 150 | 850 | 77 | 0.045 |
| 22 | Compound (1) | 40 | Compound (5) | 60 | 120 | 0 | 720 | 720 | 131 | 0.046 |
| 23 | Compound (1) | 40 | Compound (5) | 60 | 120 | 570 | 180 | 750 | 136 | 0.045 |
| 24 | Compound (1) | 40 | Compound (5) | 60 | 120 | 780 | 0 | 780 | 142 | 0.045 |
| 25 | Compound (1) | 40 | Compound (6) | 60 | 120 | 570 | 180 | 750 | 136 | 0.048 |
| Comparative Example 1 | Compound (1) | 40 | Compound (5) | 60 | 120 | 0 | 0 | 0 | 0 | 0.062 |
| Comparative Example 2 | Compound (1) | 40 | Compound (5) | 60 | 120 | 420 | 460 | 880 | 160 | 0.064 |
| Comparative Example 3 | Compound (6) | 40 | Compound (7) | 60 | 120 | 450 | 370 | 820 | 149 | 0.069 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-150273, filed Sep. 21, 2022, which is hereby incorporated by reference herein in its entirety.

What is claimed is:

1. An electrophotographic photosensitive member having a support and a photosensitive layer on the support;

the photosensitive layer comprises (α) a compound represented by a following formula (1), and (β) at least one selected from the group consisting of a compound represented by a following formula (2) and a compound represented by a following formula (3), wherein a content of the (β) with respect to a content of the (α) is 50 to 850 mass ppm in the photo sensitive layer.

(1)

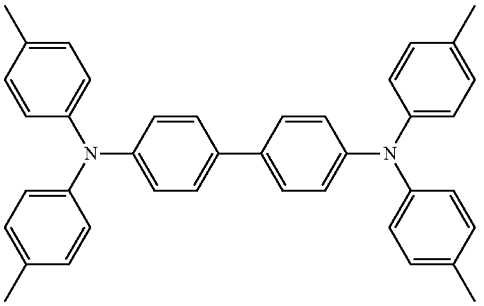

(2)

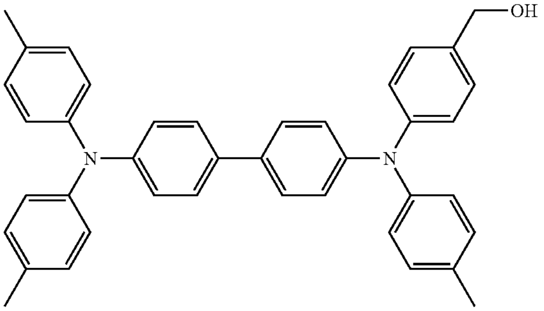

(3)

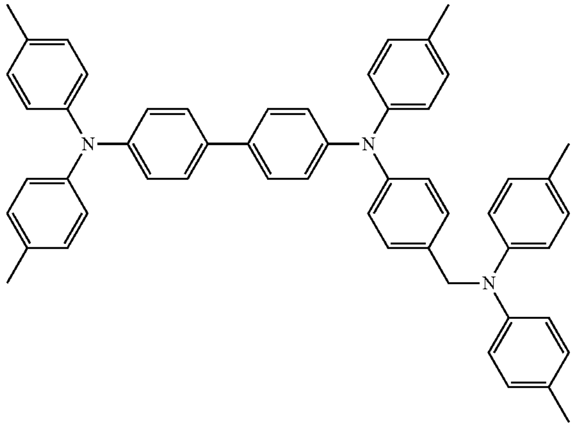

2. The electrophotographic photosensitive member according to claim 1, wherein the photo sensitive layer comprises the compound represented by the formula (2), and wherein a content of the compound represented by the formula (2) with respect to a content of the compound represented by the formula (1) is 350 mass ppm or less in the photo sensitive layer.

3. The electrophotographic photosensitive member according to claim 1, wherein the photo sensitive layer comprises the compound represented by the formula (3), and wherein a content of the compound represented by the formula (3) with respect to a content of the compound represented by the formula (1) is 480 mass ppm or less in the photo sensitive layer.

4. The electrophotographic photosensitive member according to claim 1, wherein the content of the (β) in the photosensitive layer with respect a total mass of the photo sensitive layer is 3 to 30 mass ppm.

5. The electrophotographic photosensitive member according to claim 1, wherein the content of the (α) in the photo sensitive layer with respect to a total mass of the photo sensitive layer is 9 to 50 mass %.

6. A process cartridge for electrophotography comprising:

an electrophotographic photosensitive member;

and at least one unit selected from the group consisting of a charging unit, a developing unit, and a cleaning unit, the process cartridge for electrophotography integrally supporting the electrophotographic photosensitive member and the at least one unit, and being detachably attachable to a main body of an electrophotographic apparatus, wherein the electrophotographic photosensitive member having a support and a photosensitive layer on the support;

the photosensitive layer comprises (α) a compound represented by a following formula (1), and (β) at least one selected from the group consisting of a compound represented by a following formula (2) and a compound represented by a following formula (3), wherein a content of the (β) with respect to a content of the (α) is 50 to 850 mass ppm in the photo sensitive layer.

(1)

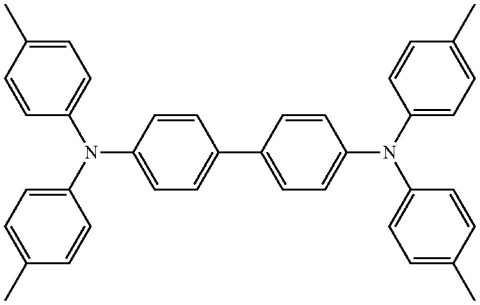

(2)

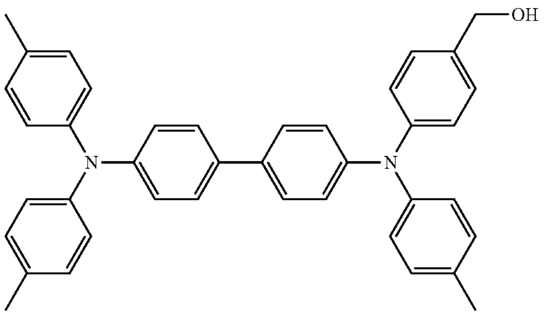

-continued (3)

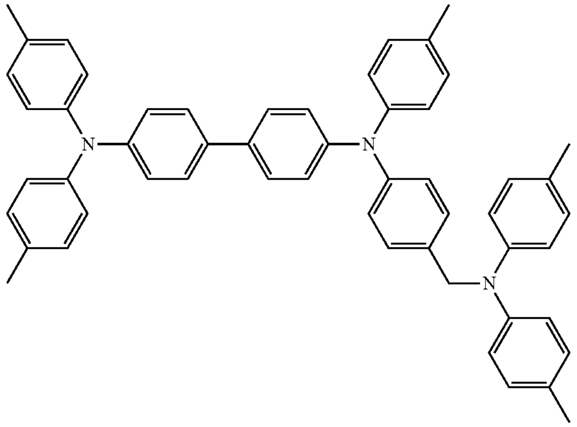

7. An electrophotographic apparatus comprising:

an electrophotographic photosensitive member, an exposing unit, a charging unit, a developing unit, and a transfer unit, wherein the electrophotographic photosensitive member having a support and a photosensitive layer on the support;

the photosensitive layer comprises (α) a compound represented by a following formula (1), and (β) at least one selected from the group consisting of a compound represented by a following formula (2) and a compound represented by a following formula (3), wherein a content of the (β) with respect to a content of the (α) is 50 to 850 mass ppm in the photosensitive layer.

(1)

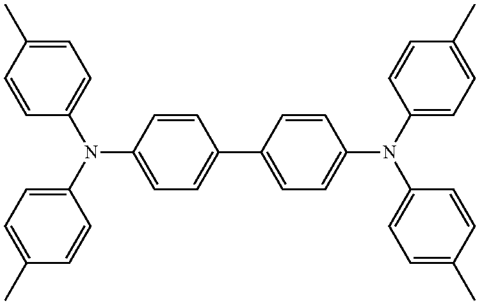

(2)

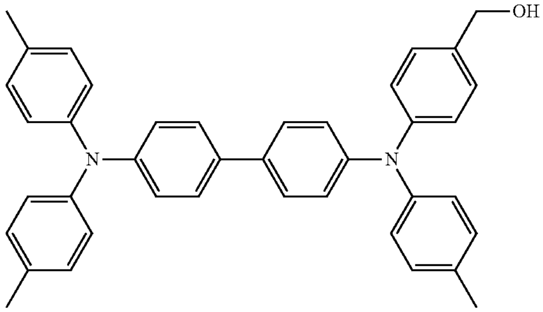

(3)

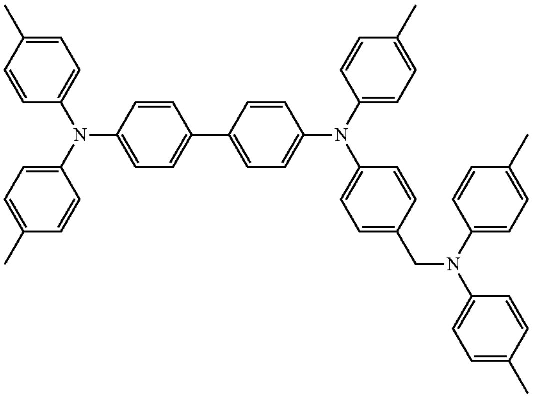

.

* * * * *